United States Patent
Takahashi et al.

(10) Patent No.: US 7,705,503 B2
(45) Date of Patent: Apr. 27, 2010

(54) ROTATING ELECTRICAL MACHINE

(75) Inventors: Norio Takahashi, Kanagawa (JP);
Kazuto Sakai, Kanagawa (JP); Yoshio Hashidate, Kanagawa (JP); Masanori Arata, Kanagawa (JP); Wataru Ito, Mie (JP); Masakatsu Matsubara, Mie (JP); Takashi Hanai, Mie (JP); Yasuo Hirano, Mie (JP)

(73) Assignees: Kabushiki Kaisha Toshiba, Tokyo (JP); Toshiba Industrial Products Manufacturing Corporation, Mie-gun (JP)

( * ) Notice: Subject to any disclaimer, the term of this patent is extended or adjusted under 35 U.S.C. 154(b) by 494 days.

(21) Appl. No.: 11/493,896

(22) Filed: Jul. 27, 2006

(65) Prior Publication Data

US 2007/0052313 A1   Mar. 8, 2007

(30) Foreign Application Priority Data

Sep. 7, 2005   (JP)   ............................. P2005-259905

(51) Int. Cl.
*H02K 1/27*   (2006.01)
*H02K 19/10*   (2006.01)

(52) U.S. Cl. ............................. 310/156.53; 310/60 A; 310/216.104

(58) Field of Classification Search ................................
310/156.3–156.574, 58–61, 60 A, 156.15, 310/216.004, 216.106
See application file for complete search history.

(56) References Cited

U.S. PATENT DOCUMENTS

| 5,838,086 A | 11/1998 | Cuenot et al. | |
| 6,703,745 B2* | 3/2004 | Chu | 310/156.45 |
| 6,717,314 B2* | 4/2004 | Horst et al. | 310/156.43 |
| 6,803,692 B2* | 10/2004 | Hattori et al. | 310/156.53 |
| 7,151,335 B2* | 12/2006 | Tajima et al. | 310/156.48 |
| 2005/0140235 A1 | 6/2005 | Yamagishi et al. | |
| 2007/0228861 A1 | 10/2007 | Kinoshita | |

FOREIGN PATENT DOCUMENTS

| CN | 1173761 A | 2/1998 |
| EP | 0 695 018 A1 | 1/1996 |
| EP | 1 067 656 A2 | 1/2001 |
| EP | 1 401 083 A2 | 3/2004 |
| JP | 09-131009 A | 5/1997 |
| JP | 09-294344 A | 11/1997 |
| JP | 11-113202 A | 4/1999 |

(Continued)

OTHER PUBLICATIONS

Kazuto Sakai et al., "High Efficiency and High Performance Motor for Energy Saving in Systems", IEEE PES Winter Meeting, Ohio, USA, Jan. 2001.

(Continued)

*Primary Examiner*—Tran N Nguyen
(74) *Attorney, Agent, or Firm*—Foley & Lardner LLP (57) ABSTRACT

Included are a ring-shaped stator and a ring-shaped rotor arranged inside the stator; the stator includes a stator core with armature windings; the rotor includes a rotor core in which a plurality of permanent magnets are inserted and cooling holes are formed, a coolant flowing in each of the cooling holes; and each of the cooling holes is formed so as to have a sectional view which is a convex toward the outer periphery thereof.

3 Claims, 7 Drawing Sheets

FOREIGN PATENT DOCUMENTS

| | | | |
|---|---|---|---|
| JP | 3170224 B2 | 3/2001 |
| JP | 3193348 B2 | 5/2001 |
| JP | 3210634 B2 | 7/2001 |
| JP | 3210642 B2 | 7/2001 |
| JP | 2001-339919 A | 12/2001 |
| JP | 2001-339922 A | 12/2001 |
| JP | 2002-034185 A | 1/2002 |
| JP | 3280896 B2 | 2/2002 |
| JP | 3290392 B2 | 3/2002 |
| JP | 2002-345188 A | 11/2002 |
| JP | 2003-061282 A | 2/2003 |
| JP | 2003-088071 A | 3/2003 |
| JP | 2004-312898 A | 11/2004 |
| JP | 2004-343915 A | 12/2004 |
| JP | 2005-012859 A | 1/2005 |
| JP | 2005184957 A * | 7/2005 |
| JP | 2005-218183 A | 8/2005 |
| WO | WO 2006/052267 A1 | 5/2006 |

OTHER PUBLICATIONS

Hideki Hisada et al., "AISIN AW New Full Hybrid Transmission for FWD Vehicles", SAE Detroit, USA, Apr. 2005.

* cited by examiner

FLOW OF THE COOLANT

ROTATING ELECTRICAL MACHINE

CROSS-REFERENCE TO RELATED APPLICATION

This application is based upon and claims the benefit of priority from the prior Japanese Patent Application No. 2005-259905, filed on Sep. 7, 2005. The entire contents of which are incorporated herein by reference.

BACKGROUND OF THE INVENTION

1. Field of the Invention

The present invention relates to a rotating electrical machine of permanent magnet implanted-type used for hybrid cars and the like.

2. Description of the Prior Art

Recent years, remarkable research and development of permanent magnets have driven development of permanent magnets each with high magnetic energy product, and to accordingly construction of rotating electrical machines each with higher power in a smaller size. In particular, with regard to rotating electrical machines for cars, such as for hybrid cars, large torque and high power are required to be produced in a limited space. In order to meet this requirement, rotating electrical machines need to be operated at high speeds by increasing forces of the respective permanent magnets.

In this case, large problems are strength of each rotor core against a higher centrifugal force, and a cooling required in response of increase in loss density. In addition, an eddy current to be generated in the surface of each of the permanent magnets is increased in response to the high-speed operation, and accordingly heat is generated. This causes heat demagnetization (irreversible demagnetization), and thus significantly reduces performances of the rotating electrical machine, such as power and efficiency. For this reason, this raises a serious problem.

Figure 1:
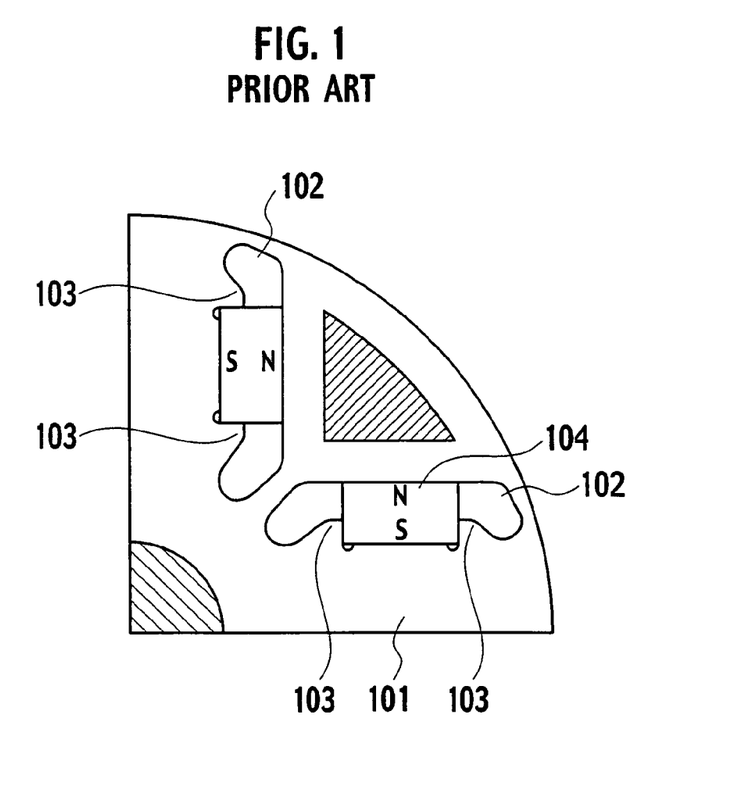
FIG. 1 is a cross-sectional view of a conventional rotating electrical machine, which is taken in the radial direction.

With these taken into consideration, permanent magnet positioning protrusions 103 are provided to a rotating electrical machine of conventional type in a way that, for example, as shown in FIG. 1, each of the permanent magnet positioning protrusions 103 juts out into a corresponding permanent magnet implanting cavity 102 in a rotor core 101. Permanent magnets 104 are supported respectively with the permanent magnet positioning protrusions 103. Thereby, strength of each of thin portions on which stresses concentrate is secured. Thus, the rotating electrical machine of conventional type is intended to produce a high power, and to operate at a high speed. (Japanese Patent Laid-open Official Gazette No. 2001-339919).

Figure 2:
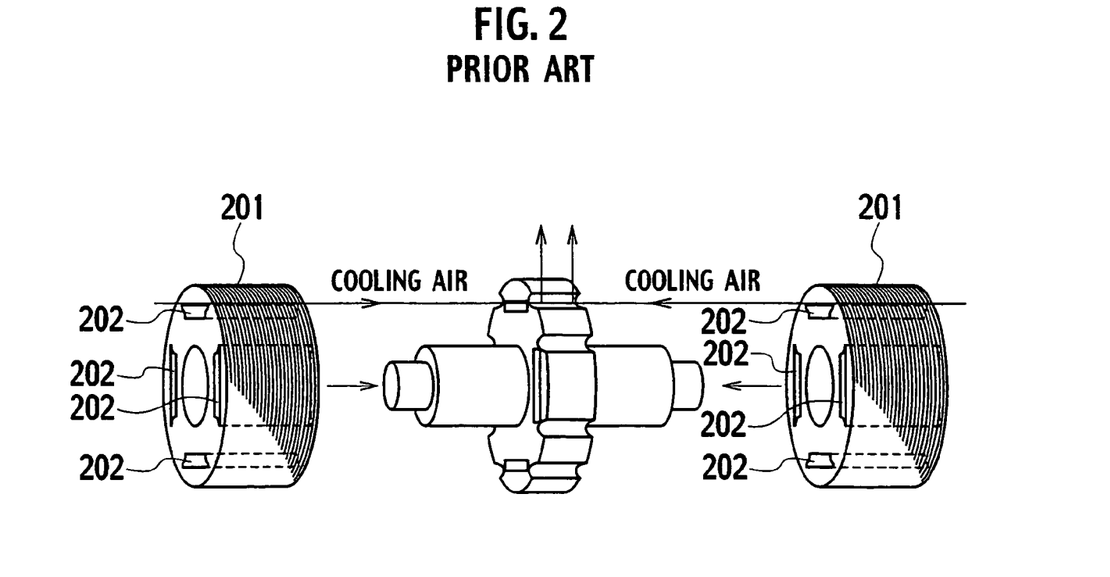
FIG. 2 is an exploded perspective view of another conventional rotating electrical machine.

In addition, the following method has been proposed as a method of cooling a rotating electrical machine using permanent magnets in a strengthened manner. As shown in FIG. 2, for example, a cooling air is caused to flow to the center portion of the shaft from each end part in the axial direction by use of permanent magnet implanting cavities 202 formed in a rotor core 201. Thereby, the center portion of the shaft and the permanent magnets are cooled down. A heating value is the largest in the center portion of the shaft. (Japanese Patent Laid-open Official Gazette No. 2004-343915, for example).

In the case of the rotating electrical machine disclosed by Japanese Patent Laid-open Official Gazette No. 2001-339919, the permanent magnets are supported with the protrusions, and thereby the strength of the rotor core is secured. This enables the rotating electrical machine to produce a high power at a high speed. However, in response to the high speed, iron loss and harmonic loss increase, and thus the temperature of the rotating electrical machine rises. In addition, heat of each of the permanent magnets stemming from eddy currents can not be sufficiently cooled down. As a result, the rotating electrical machine has a problem that the power and efficiency are reduced due to the temperature rise of the rotating electrical machine, and that the reliability is accordingly decreased.

Moreover, in the case of the rotating electrical machine according to Japanese Patent Laid-open Official Gazette No. 2004-343915, the strength of the rotor core against the centrifugal force can not be secured. This raises a problem that it is difficult for the rotating electrical machine to be operated at a high speed.

SUMMARY OF THE INVENTION

The present invention has been made for the purpose of solving the foregoing problems. An object of the present invention is to provide a rotating electrical machine, whereby a cooling performance is enhanced while securing strength of a rotor, which is large enough for the rotor to withstand high-speed rotation, whereby a large torque and a high power can be obtained while in a compact size, and whereby reliability is enhanced.

For the purpose of achieving the aforementioned object, a first rotating electrical machine according to the present invention is characterized by including a ring-shaped stator and a rotor arranged inside this stator. The rotating electrical machine is characterized in that the stator includes a stator core with armature windings; the rotor includes a rotor core in which permanent magnets are inserted and cooling holes are formed, a coolant flowing in each of the cooling holes; and each of the cooling holes is formed so as to have a sectional view which is a convex toward the outer periphery thereof.

In addition, a second rotating electrical machine according to the present invention is characterized by including a ring-shaped stator and a ring-shaped rotor arranged inside this stator. The rotating electrical machine is characterized in that the stator includes a stator core with armature windings; the rotor includes a rotor core in which permanent magnets are inserted and cooling holes are formed, a coolant flowing in each of the cooling holes; and $Ti \times 60/(\pi \times D \times N) \geq 1.5 \times 10^{-4}$, where D denotes the outer diameter of the rotor, N denotes the maximum number of rotation, and Ti denotes the thickness of a part between the cooling hole and the inner periphery of the rotor.

A third rotating electrical machine according to the present invention is characterized by including a ring-shaped stator and a rotor arranged inside this stator. The rotating electrical machine is characterized in that the stator includes a stator core with armature windings; the rotor includes a rotor core in which a plurality of permanent magnets are inserted along the outer periphery thereof and cooling holes are formed, a coolant flowing in each of the cooling holes; and $Wm/Wp \geq 0.06$, where Wp denotes the distance between paired permanent magnets at a magnetic pole formed along the outer periphery of the rotor core, and Wm denotes the shortest distance between one of the paired permanent magnets and corresponding one of the cooling holes.

A fourth rotating electrical machine according to the present invention is characterized by including a ring-shaped stator and a rotor arranged inside this stator. The rotating electrical machine is characterized in that the stator includes a stator core with armature windings; the rotor includes a rotor core in which permanent magnets are inserted; each of the permanent magnets is divided in order for the permanent magnet to have an interstice extending in the axial direction of the rotor; and the interstice is used as a cooling path in which a coolant flows.

A fifth rotating electrical machine according to the present invention is characterized by including a ring-shaped stator and a rotor arranged inside this stator. The rotating electrical machine is characterized in that the stator includes a stator core with armature windings; and the rotor includes a rotor core having cavities in which permanent magnets are inserted, respectively and a heat conduction sheet interposed between an inner surface of each of the cavities and corresponding one of the permanent magnets.

A sixth rotating electrical machine according to the present invention is characterized by including a ring-shaped stator and a rotor arranged inside this stator. The rotating electrical machine is characterized in that the stator includes a stator core with armature windings; the rotor includes a rotor core having two cavities provided to each of a plurality of predetermined locations set up along the outer periphery at intervals in the circumferential direction of the rotor and permanent magnets inserted respectively in the cavities; the two cavities are formed so as to be shaped like the letter V which opens to the outer periphery of the rotor core; and an outer peripheral corner portion of each of the permanent magnets has a gap opposite thereto, the outer peripheral corner portion being near a corresponding magnetic pole.

A seventh rotating electrical machine according to the present invention is characterized by including a ring-shaped stator and a rotor arranged inside this stator. The rotating electrical machine is characterized in that the stator includes a stator core with armature windings; the rotor includes a rotor core having cavities extending in the axial direction and permanent magnets inserted respectively in the cavities in a way that each of the permanent magnets is in contact with an inner surface of corresponding one of the cavities; and a groove-shaped cooling path is provided to the inner surface of the cavity with which the permanent magnet is in contact, the groove-shaped cooling path extending in the axial direction, and a coolant flowing in the groove-shaped cooling path.

The present invention makes it possible to enhance cooling performance while securing strength of a rotor, which is large enough for the rotor to withstand high-speed rotation, to obtain large torque and high power while in a compact size, and to enhance reliability.

DETAILED DESCRIPTION OF THE PREFERRED EMBODIMENT

First Embodiment

Figure 3:
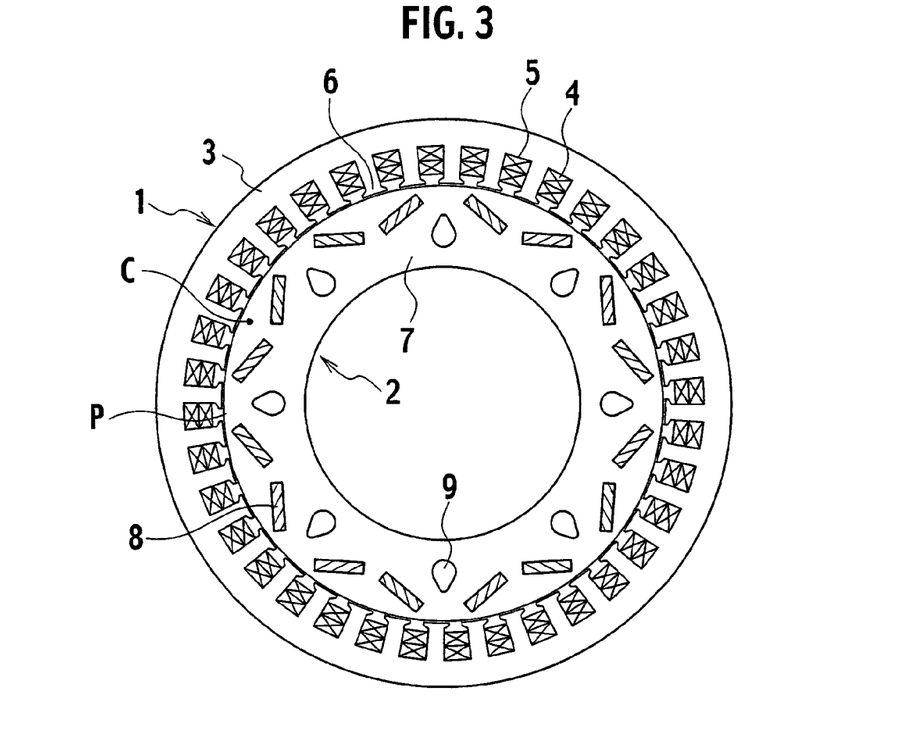
FIG. 3 is a cross-sectional view of a rotating electrical machine according to a first embodiment of the present invention, which is taken in the radial direction.

FIG. 3 is a cross-sectional view of a rotating electrical machine according to a first embodiment of the present invention, which is taken in the radial direction. In FIG. 3, the rotating electrical machine has a stator 1 and a rotor 2 provided to the inside of the stator 1.

The stator 1 has a stator core 3 constituted by layering a plurality of ring-shaped electromagnetic steel sheets. A plurality of stator slots 5 each for containing an armature winding 4 are formed along the inner circle at intervals in the circumferential direction. A stator tooth 6 facing the rotor 2 is formed between each two of the stator slots 5.

Figure 4:
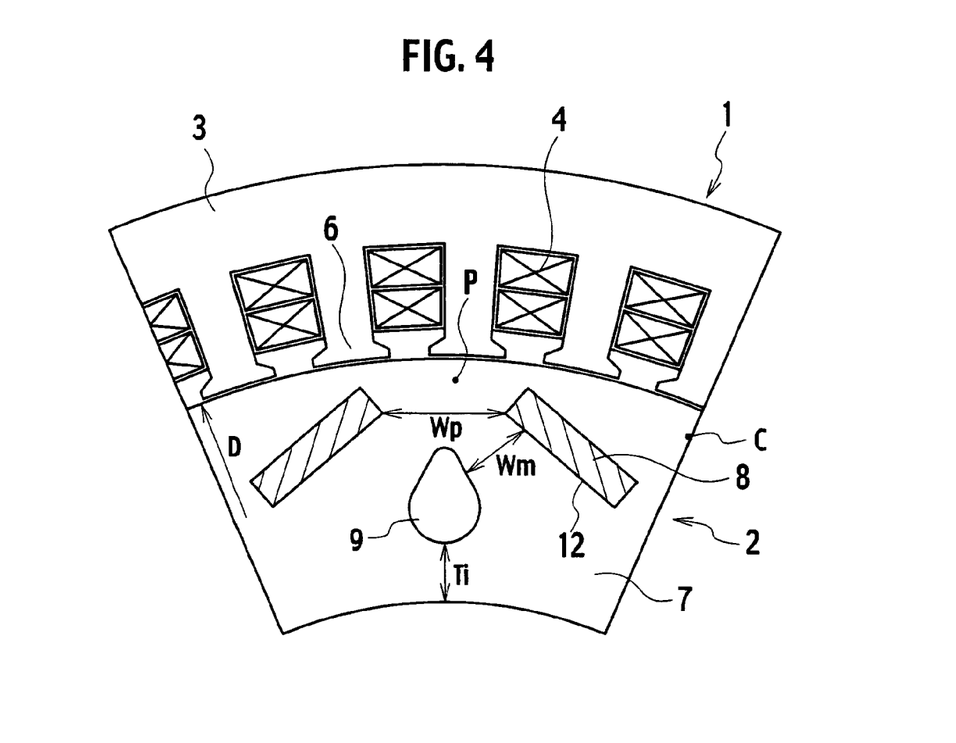
FIG. 4 is an enlarged cross-sectional view of a part of the rotating electrical machine shown in FIG. 3.

FIG. 4 is an enlarged view of a part of the rotating electrical machine shown in FIG. 3. The rotor 2 is arranged in the inside of the stator 1 with an interstice interposed between the rotor 2 and each of the stator teeth 6. The rotor 2 includes a ring-shaped rotor core 7 and a plurality of plate-shaped permanent magnets 8 inserted along the outer periphery thereof.

Two permanent magnets 8 are provided to each of predetermined places set up along the outer periphery of the rotor core 7 at equal intervals in the circumferential direction. Each neighboring two permanent magnets 8 are arranged in a shallow V-formation which opens to the outer periphery of the rotor core 7.

The rotor core 7 is configured by layering a plurality of ring-shaped electromagnetic steel sheets. Axes of easy magnetization and axes of hard magnetization are formed there in an alternating manner in the circumferential direction about the rotational axis thereof. The rotor 2 rotates about the rotational axis due to a rotating magnetic field stemming from current flowing in the armature windings 4 held by the stator core 3.

Cavities 12 are provided to the rotor core 7 in the axial direction in a way that the cavities 12 are arranged along a flow of a magnetic flux generating a reluctance torque. Each pair of permanent magnets 8 inserted in corresponding two of the cavities 12 offsets magnetic fluxes of the armature windings 4 which pass respectively through magnetic poles Pin directions crossing over the magnetic flux generating the reluctance torque. This inhibits a leakage field at an end portion of each of the magnetic poles. Thus, magnetic concaves and convexes are formed along the circumferential direction of the rotor core 7.

In addition, the rotor core 7 is provided with cooling holes 9 each with a cross section which is curved outward to the outer periphery. These cooling holes 9 extend in the axial direction of the rotor 2. A coolant flows inside each of the cooling holes 9.

Furthermore, when D denotes the outer diameter of the rotor 2, N denotes the maximum number of rotation of the rotor 2, and Ti denotes the thickness in the radial direction of a part between one of the cooling holes 9 and the inner periphery of the rotor 2, each of the cooling holes 9 is arranged there in a way that a ratio obtained by dividing the thickness Ti by a circumferential velocity at the outer diameter of the rotor expressed by $(\pi \times D \times N)/60$ is equal to $1.5 \times 10^{-4}$. ($Ti \times 60/\pi D \times N = 1.5 \times 10^{-4}$)

Moreover, when, as shown in FIG. 4, Wp denotes the distance between paired permanent magnets 8 at corresponding one of the magnetic poles P of the rotor 2, and Wm denotes the shortest distance between one of the paired permanent magnets 8 and corresponding one of the cooling hole 9 arranged there, the cooling hole 9 is arranged there in a way that a ratio obtained by dividing Wm by Wp is equal to 0.60. (Wm/Wp=0.60)

The magnetic flux flowing in the rotor core 7 passes from the outer periphery of the magnetic pole P through the middle between the paired permanent magnets 8 at the magnetic pole P, and thereafter passes through the middle between the one of the paired permanent magnets 8 and the cooling hole 9, thus flowing into a neighboring magnetic pole.

Since each of the cooling holes 9 is shaped like a convex which is curved outward to the outer periphery of the rotor 2, the cross-sectional area of the cooling hole 9 can be secured without causing the cooling hole 9 to obstruct the flow of the magnetic flux in the rotor core 7.

Figure 5:
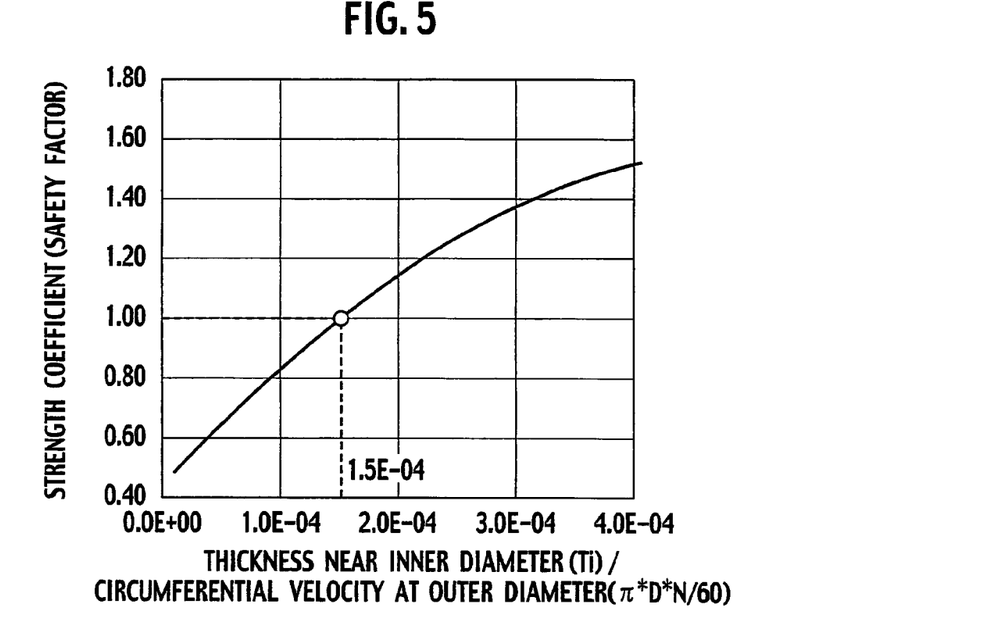
FIG. 5 is a graph showing a relationship between a value obtained by dividing the thickness Ti of a rotor core near the inside diameter by a circumferential velocity at the outer diameter of the rotor and a strength coefficient (safety factor) of the rotor core.

FIG. 5 is a graph showing a relationship between a value obtained by dividing the thickness Ti of the rotor core 7 near the inner diameter by the circumferential velocity at the outer diameter of the rotor 7 and a strength coefficient (safety factor) of a rotor core 7.

The strength coefficient (safety factor) of the rotor core 7 is an index (strength safety factor) to indicate how large the material strength (allowable stress) of the rotor core 7 is relative to the maximum stress generated in the rotor core 7 due to the centrifugal force generated by the rotation (hereinafter referred to as a "rotational centrifugal force") of the rotor core 7. It is necessary that the strength coefficient should be equal to or more than 1.0.

The following facts can be learned from FIG. 5. When the value obtained by dividing the thickness Ti near the inner diameter by the circumferential velocity at the outer diameter of the rotor 2 is increased, or when the ratio of the thickness Ti near the inner diameter to the circumferential velocity at the outer diameter $(\pi \times D \times N/60)$ is increased, the strength coefficient (safety factor) of the rotor core 7 is also increased. When the ratio of the thickness Ti near the inner diameter to the circumferential velocity at the outer diameter is equal to $1.5 \times 10^{-4}$, the strength coefficient (safety factor) of the rotor core 7 is equal to 1.0.

Accordingly, the following fact can be learned. In a case where the dimension of the outer diameter and the maximum number of rotation of the rotor 2 as well as the material strength of the rotor core 7 are fixed, the ratio of Ti to the circumferential velocity at the outer diameter is equal to $1.5 \times 10^{-4}$, when Ti takes on the minimum value needed for securing the strength of the rotor core 7.

Figure 6:
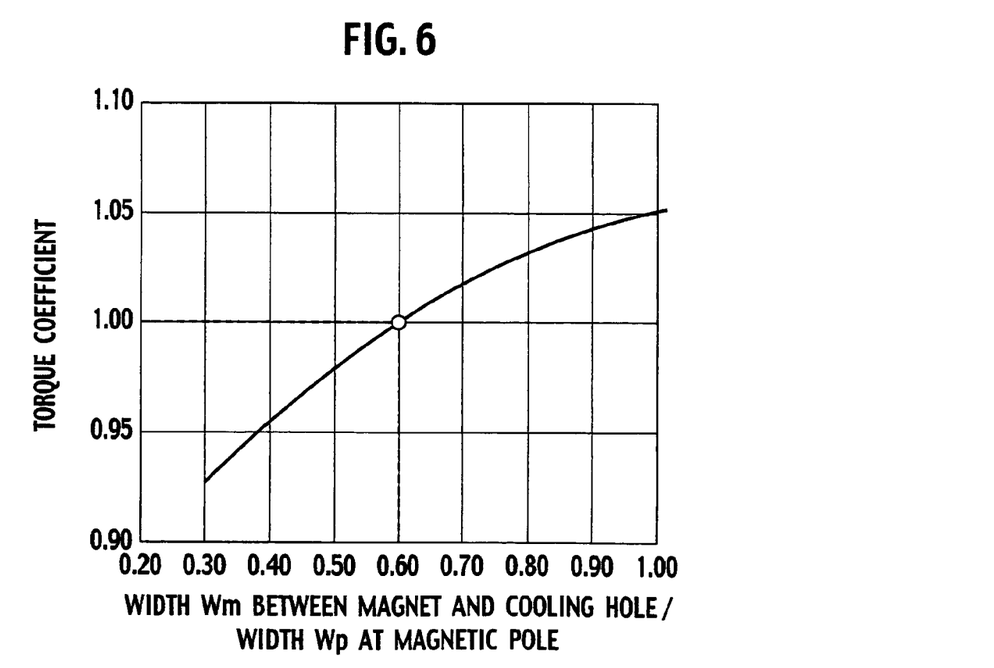
FIG. 6 shows a relationship between a torque coefficient and a value obtained by dividing the shortest distance Wm between one of paired permanent magnets and a corresponding cooling hole by the distance Wp between the paired permanent magnets at a corresponding magnetic pole P.

In addition, FIG. 6 shows a relationship between a torque coefficient and a value obtained by dividing the shortest distance Wm between one of paired permanent magnets 8 and corresponding one of the cooling holes 9 by the distance Wp between the paired permanent magnets 8 at corresponding one of the magnetic poles P. The torque coefficient indicates a ratio of a torque, which the rotating electrical machine is capable of generating, to a torque required from the rotating electrical machine in accordance of the specifications thereof. The torque coefficient is an important index for evaluating the performances of the rotating electrical machine. It is essential that this torque coefficient should be equal to or more than 1.0.

The following facts can be learned from FIG. 6. When the ratio of Wm to Wp is increased, the torque coefficient is also increased in response. When the ratio of Wm to Wp is equaled to 0.60, the torque coefficient is equal to 1.0. As a result, in a case where Wp is fixed, the ratio of Wm to Wp is equal to 0.60, when Wm is the smallest necessary for generating a torque required from the rotating electrical machine.

In the case of this embodiment, each of the cooling holes 9 is shaped like the convex which is curved outward to the outer periphery. This makes it possible to effectively secure (increase) the cross-sectional area of each of the cooling holes 9 without obstructing the flow of the magnetic flux in the rotor core 7. Accordingly, this makes it possible to increase a heat transfer area for cooling the inside of the rotor core 7 and a flow rate of the coolant (for example, cooling oil), and to thus enhance the cooling performance.

Furthermore, the cross-sectional area of each of the cooling holes 9 can be effectively secured. This makes it possible to reduce the mass of the rotor core 7, and to accordingly inhibit the stress stemming from the rotational centrifugal force. As a result, the reliability is enhanced.

Moreover, the rotational inertia force of the rotor 2 can be similarly reduced in response to the reduction of the mass of the rotor core 7. This enhances the controllability of the rotation of the rotating electrical machine. Accordingly, this enhances the reliability including acceleration characteristics, deceleration characteristics and control of the rotating electrical machine as a driving system.

As well, when the ratio of the thickness Ti near the inner diameter to the circumferential velocity at the outer diameter of the rotor 2 is equal to or more than $1.5 \times 10^{-4}$, the strength coefficient (safety factor 1.0) of the rotor 2 can be secured. This reason makes it unlikely that the rotor 2 may be broken. Thus, the reliability is enhanced.

In addition, when the ratio of the thickness Ti near the inner diameter to the circumferential velocity at the outer diameter of the rotor 2 is equaled to $1.5 \times 10^{-4}$, and when the thickness Ti near the inner diameter is the smallest necessary for securing the strength of the rotor core 7, the larger cross-sectional area of each of the cooling holes 9 can be secured. Accordingly, this makes it possible to increase the mileage due to the reduction of the mass of the rotor 2, and to enhance the cooling performance and the controllability of the driving system. As a result, the reliability is enhanced.

Moreover, when the ratio of the shortest distance Wm between one of paired permanent magnets 8 and a corresponding cooling hole 9 to the distance Wp at a corresponding magnetic hole is equal to or more than 0.60, the torque coefficient can be equal to, or larger than, 1.0. This makes it possible to secure a torque required from the rotating electrical machine. In addition, when the ratio of the shortest distance Wm between one of the paired permanent magnets 8 and the corresponding cooling hole 9 to the distance Wp between the paired permanent magnets 8 at the corresponding magnetic hole to is equal to 0.60, and when the distance Wm between the permanent magnet 8 and the corresponding cooling hole 9 is the smallest necessary for generating a torque required from the rotating electrical machine, the larger cross-sectional area of each of the cooling holes 9 can be similarly secured. Accordingly, this makes it possible to increase the mileage due to the reduction of the mass of the rotor 2, and to enhance the cooling performance and the controllability of the driving system. As a result, the reliability is enhanced.

Second Embodiment

Figure 7:
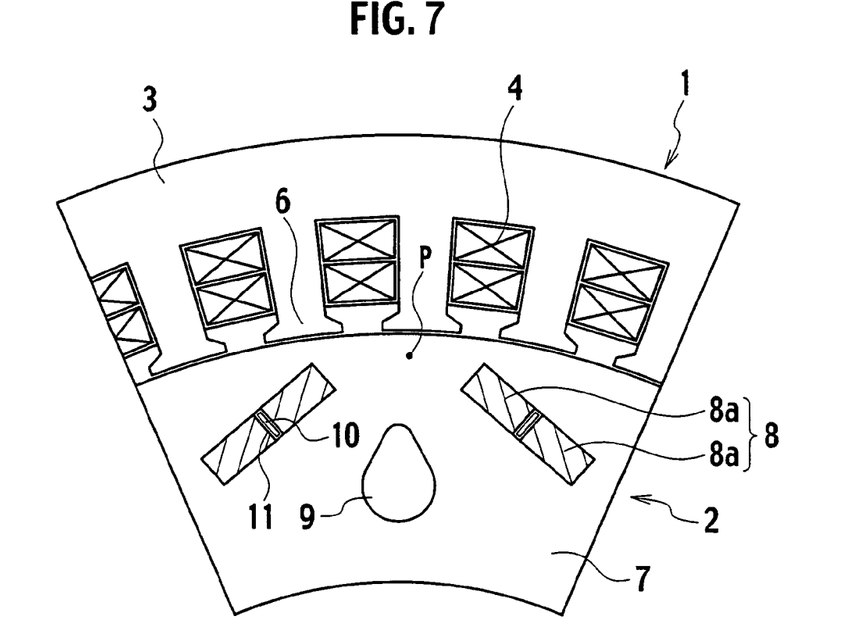
FIG. 7 is a cross-sectional enlarged view of a rotating electrical machine according to a second embodiment of the present invention, which is taken in the radial direction.

FIG. 7 is a cross-sectional enlarged view of a rotating electrical machine according to a second embodiment of the present invention, which is taken in the radial direction. Incidentally, in the descriptions of the following embodiments, the same reference numerals will be used to designate the same or similar components as those in the previously-described embodiment.

In the case of this embodiment, each of the permanent magnets 8 is divided into a pair of parts 8a in a direction parallel to the polarization direction in order for the permanent magnet 8 to have an interstice 10 extending in the axial direction of a rotor 2. Concurrently, a duct 11 made of a material with heat conductivity and rigidity is arranged coaxially in the interstice 10 between the divided parts 8a in a way that the duct 11 is in contact with the inner surface of the interstice 10. The inside of the duct 11 is used as a cooling path through which a coolant passes.

Such a configuration makes it possible to cool the permanent magnets 8 directly with the coolant, and to inhibit the temperature of each of the permanent magnets 8 from rising. Accordingly, this makes it possible to abate decrease of the amount of magnetic flux which stems from the rise of the temperature of each of the permanent magnets 8, and to enhance the performances of the rotating electrical machine, including the torque characteristics and the efficiencies. Moreover, this eliminates the likelihood that the performances may be deteriorated due to a heat demagnetization (irreversible demagnetization), and thus enhance the reliability.

In addition, the division of each of the permanent magnets 8 makes it possible to disperse a force which is applied to the rotor core 7 due to the rotational centrifugal force of the permanent magnet 8, and to reduce stress generated in the rotor core 7.

Furthermore, the duct 11 is arranged in the interstice 10 between the pair of parts 8a obtained by dividing each of the permanent magnets 8, and the inside of the duct 11 is used as the cooling path. Accordingly, this makes it possible to secure the cooling path with a predetermined cross-sectional area, and to prevent leakage of the coolant flowing in the cooling path, deformation of the cooling path due to the rotational centrifugal force and the like. As a result, the reliability is enhanced.

Third Embodiment

Figure 8:
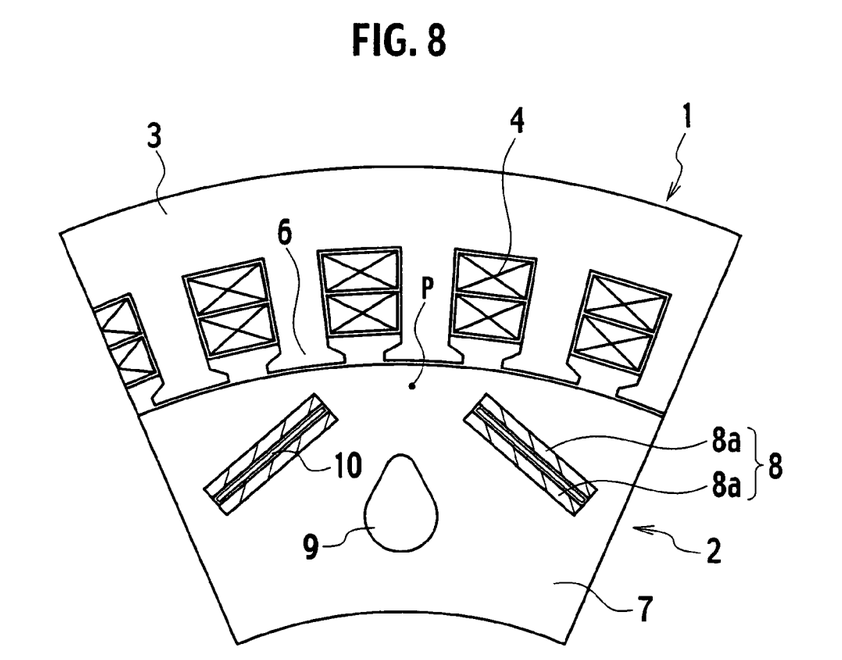
FIG. 8 is a cross-sectional enlarged view of a rotating electrical machine according to a third embodiment of the present invention, which is taken in the radial direction.

FIG. 8 is a cross-sectional enlarged view of a rotating electrical machine according to a third embodiment of the present invention, which is taken in the radial direction.

In the case of this embodiment, each of the permanent magnets 8 is divided into a pair of parts 8a in a direction perpendicular to the polarization direction in order for the permanent magnet 8 to have an interstice 10 extending in the axial direction of a rotor 2. Concurrently, a duct 11 made of a material with heat conductivity is arranged in the interstice 10 between the divided parts 8a in a way that the duct 11 is in contact with the inner surface of the interstice 10. The inside of the duct 11 is used as a cooling path through which a coolant passes.

Such a configuration makes it possible not only to obtain working effects which are the same as those described with regard to the second embodiment, but also to make the heat transfer area for cooling each of the permanent magnets 8 larger than the heat transfer area according to the second embodiment. Accordingly, this makes it possible to further inhibit the rise of the temperature of each of the permanent magnets 8, and to markedly abate the reduction of the amount of magnetic flux of each of the permanent magnets 8, which stems from the temperature rise. This makes it possible to enhance the performances of the rotating electrical machine, including the torque characteristics and the efficiencies. Moreover, this makes it less likely that the performances may be deteriorated due to a heat demagnetization (irreversible demagnetization), and thus enhance the reliability remarkably.

Fourth Embodiment

Figure 9:
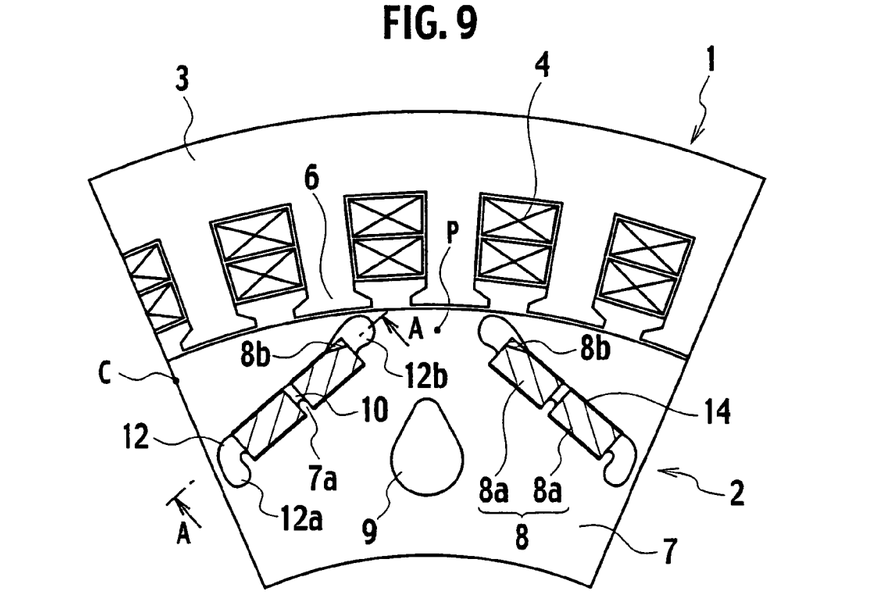
FIG. 9 is a cross-sectional enlarged view of a rotating electrical machine according to a fourth embodiment of the present invention, which is taken in the radial direction.
Figure 10:
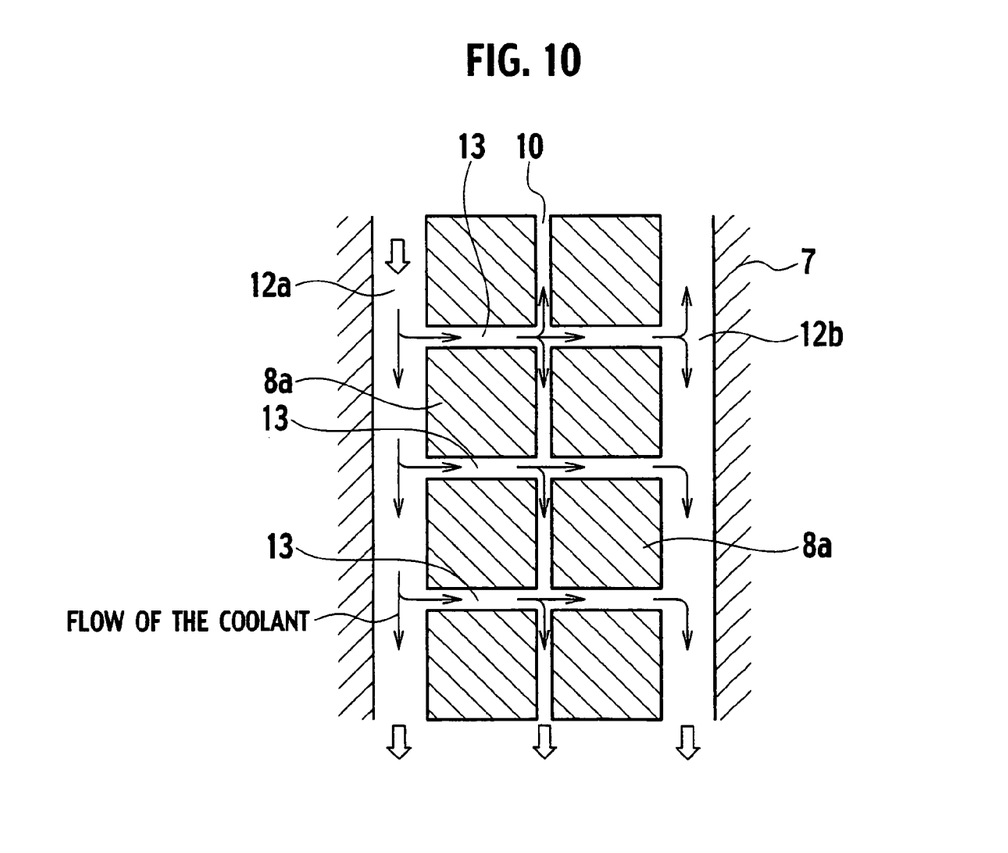
FIG. 10 is a cross-sectional view of the rotating electrical machine according to the fourth embodiment, which is taken along the A-A line of FIG. 9.

FIG. 9 is a cross-sectional enlarged view of a rotating electrical machine according to a fourth embodiment of the present invention, which is taken in the radial direction. FIG. 10 is a cross-sectional view of the rotating electrical machine according to the fourth embodiment, which is taken along the A-A line of FIG. 9.

In the case of the fourth embodiment, as shown in FIG. 9, protrusions 7a are provided to the rotor core 7. Each of the protrusions 7a protrudes from the rotor core 7 between a corresponding pair of parts 8a obtained by dividing each of the permanent magnets 8. This protrusion 7a supports each of the paired parts 8a in order for the parts 8a not to move in a direction orthogonal to the axial direction of the rotor 2.

Cavities 12 are formed in the rotor core 7 in order for corresponding permanent magnets 8 to be inserted therein. The cavities 12 extend in the axial direction of the rotor core 7, and each two neighboring permanent magnets 8 are arranged in a shallow V-formation which opens to the outer periphery of the rotor core 7. In addition, two extremities 12a and 12b of each of the cavities 12 extend outwards respectively from extremities of the corresponding permanent magnet 8, and thus form gaps respectively.

Moreover, bypass cooling paths 13 are provided therein. Each of the bypass cooling paths 13 starts in one extremity 12a of corresponding one of the cavities 12, crosses over a corresponding interstice 10, and reaches the other extremity 12b of the cavity 12. Furthermore, a heat conduction sheet 14 is interposed between each of the permanent magnets 8 and the inner surface of the corresponding cavity 12.

In the case of such a configuration, since the protrusions 7a protruding from the rotor core 7 in order to support the permanent magnets 8 respectively are provided thereto, this provision makes it easy to position the permanent magnets 8 for the insertion during manufacturing. As well, even in a case where the adhesive or the like for fixing the permanent magnets 8 thereto is deteriorated, the permanent magnets 8 can be securely held at predetermined positions respectively. Consequently, this makes it possible to eliminate the likelihood that the permanent magnets 8 may be scattered, and the likelihood that the rotor 2 may be broken. Thus, this enhances the reliability.

In addition, parts except for the protrusion 7a in the interstice 10 in each of the permanent magnets 8 serve as the cooling path in which the coolant passes. This enhances the cooling performance.

Furthermore, since the bypass cooling paths 13 each passing from one extremity 12a of the corresponding cavity 12 to the other extremity 12b of the cavity 12 are formed, the coolant flowing in the extremity 12a, for example, a cooling oil, not only flows in the axial direction, but also flows towards the other extremity 12b and downstream in the axial direction while passing through the bypass cooling paths 13 due to the rotational centrifugal force. Accordingly, this makes it possible to directly cool a center part of each of the permanent magnets 8 in the axial direction which is prone to have a temperature higher than an extremity of the permanent magnet 8 in the axial direction. This enhances the cooling performance.

Moreover, the heat conduction sheet 14 placed between each of the permanent magnets 8 and the inner surface of the corresponding cavity 12 makes it possible to decrease a contact thermal resistance due to the contact between the rotor core 7 and the permanent magnet 8 so that the cooling performance is enhanced. In addition, application of the centrifugal force presses each of the permanent magnets 8 against the inner surface of the corresponding cavity 12 with the heat conduction sheet 14 interposed in between. Accordingly, this decreases a gap between the permanent magnet 8 and the heat conduction sheet 14 and a gap between the heat conduction sheet 14 and the cavity 12, and thus reduces the contact thermal resistance further. Thereby, the cooling performance is enhanced. As well, the provision of the heat conduction sheets 14 eases an impact applied from the permanent magnets 8 to the rotor core 2.

It should be noted that a magnetic flux in a direction reverse to the polarization direction of each of the permanent magnets 8 is concentrated on a peripheral corner portion 8b of the permanent magnet 8 near the corresponding magnetic pole due to an electromagnetic field formed by a current in the corresponding armature winding 4 in the stator 1. That is because the rotating electrical machine is driven, or because the rotating electrical machine generates power. This concentration causes irreversible demagnetization in this corner portion 8b, and thus the amount of magnetic flux is decreased to a large extent. In addition, an electromagnetic force stems from higher harmonics which are generated when the rotor 2 passes across parts facing the stator teeth 6 due to the rotation during operation. Due to this electromagnetic force, an eddy current occurs at the peripheral corner portion 8b of the permanent magnet 8 near the magnetic pole, and thus heat is generated. As a result, this local temperature rise causes heat demagnetization (irreversible demagnetization) at the peripheral corner portion 8b near the magnetic pole. Thus, the amount of magnetic flux of the permanent magnet 8 is decreased to a large extent.

In the case of this embodiment, the gap (the extremity 12b of the cavity 12) is provided to a portion facing each of the peripheral corner portions 8b in the rotor core 7 near the corresponding magnetic pole. Thereby, the peripheral corner portion 8b near the corresponding magnetic pole and the rotor core 7 are not in contact with each other. As a result, this enlarges the magnetic resistance, and makes it hard for the magnetic flux in a direction reverse to the polarization direction of each of the permanent magnets 8 to flow. The magnetic flux stems from the electromagnetic field from the corresponding armature winding 4. This eliminates the likelihood that the irreversible demagnetization may occur. In addition, the flow of the coolant in this gap makes it possible to directly cool the peripheral corner portion 8b near the magnetic pole, where the eddy current generates heat, and to eliminate the likelihood that the heat demagnetization occurs in the permanent magnet 8.

Fifth Embodiment

Figure 11:
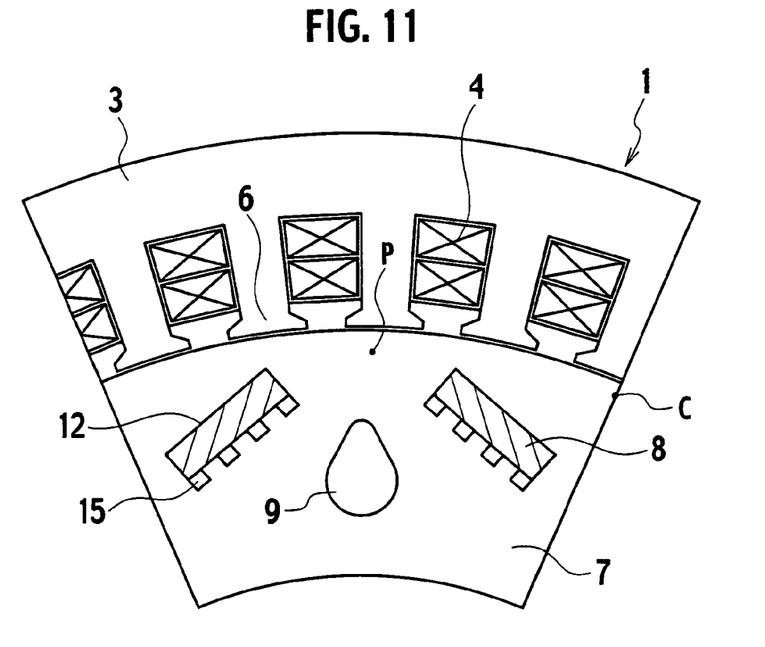
FIG. 11 is a cross-sectional enlarged view of a rotating electrical machine according to a fifth embodiment of the present invention, which is taken in the radial direction.

FIG. 11 is a cross-sectional enlarged view of a rotating electrical machine according to a fifth embodiment of the present invention, which is taken in the radial direction.

The fifth embodiment is characterized in that, as shown in 9, a plurality of groove-shaped cooling paths 15 extending in the axial direction are provided to a contact surface in each cavity 12 in which a permanent magnet 8 is embedded, the contact surface being near the inner periphery. In the contact surface, the cavity 12 contacts the corresponding permanent magnet 8.

In the case of such a configuration, the flow of a coolant in the cooling paths 15 makes it possible to directly cool the permanent magnets 8. Accordingly, this makes it possible to inhibit a rise of the temperature of each of the permanent magnets 8, to thus abate the reduction of the amount of magnetic flux of each of the permanent magnets, which stems from the temperature rise, and to hence enhance the performances of the rotating electrical machine, including the torque characteristics and the efficiencies. Furthermore, this eliminates the likelihood that the heat demagnetization (irreversible demagnetization) may deteriorate the performances, and thus enhances the reliability.

Sixth Embodiment

Figure 12:
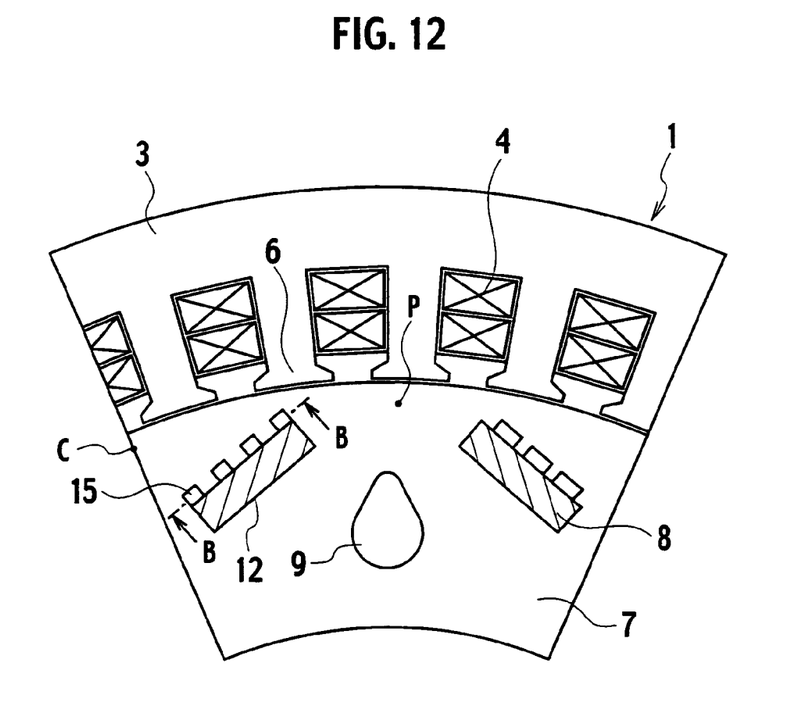
FIG. 12 is a cross-sectional enlarged view of a rotating electrical machine according to a sixth embodiment of the present invention, which is taken in the radial direction.
Figure 13:
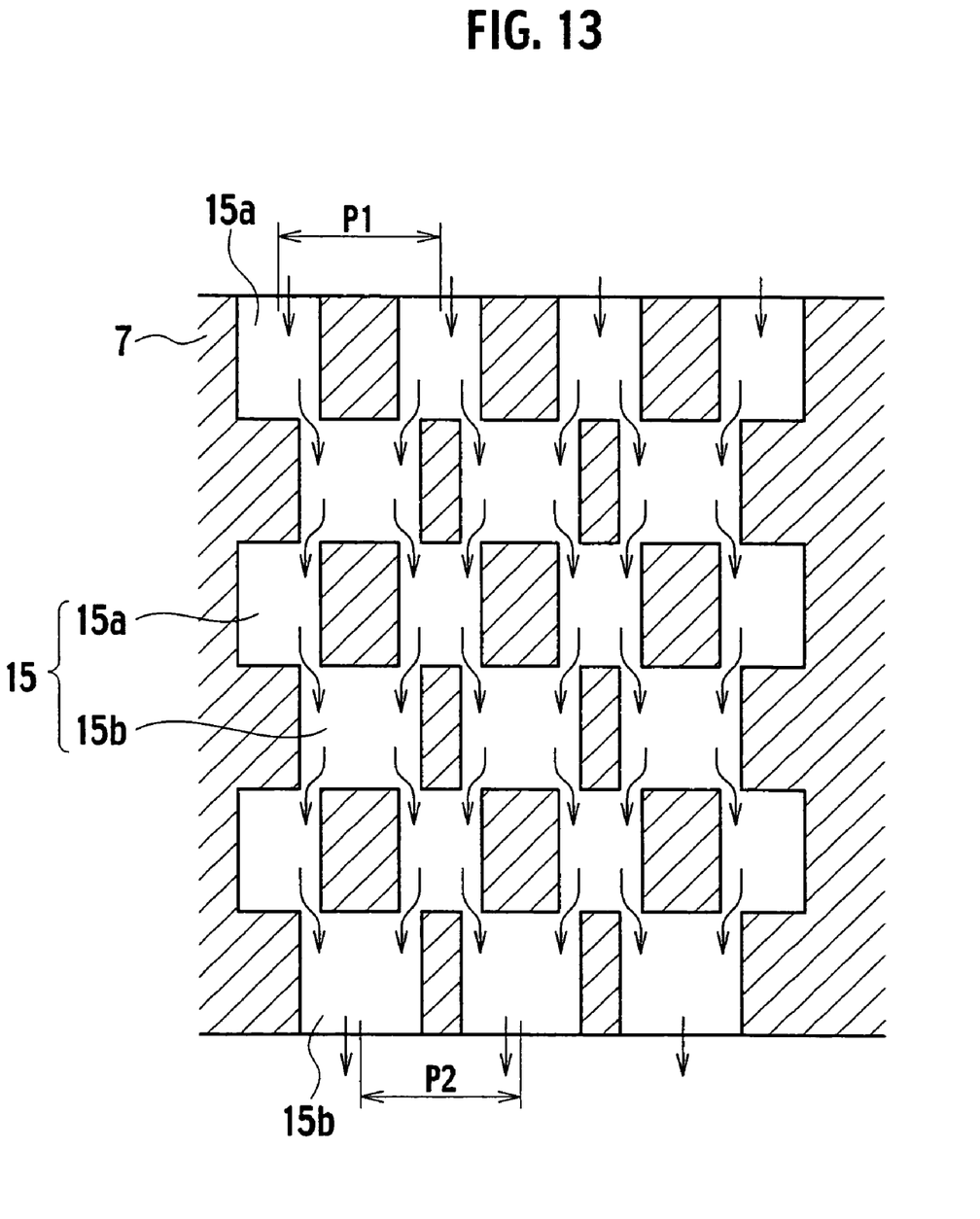
FIG. 13 is a cross-sectional view of the rotating electrical machine according to the sixth embodiment, which is taken along the B-B line of FIG. 12.

FIG. 12 is a cross-sectional enlarged view of a rotating electrical machine according to a sixth embodiment of the present invention, which is taken in the radial direction. FIG. 13 is a cross-sectional view of the rotating electrical machine according to the sixth embodiment, which is taken along the B-B line of FIG. 12.

This embodiment is characterized in that, as shown in FIG. 12, a plurality of groove-shaped cooling paths 15 are provided to an inner surface of each cavity 12 in which corresponding one of the permanent magnets 8 is embedded, the inner surface being near the outer periphery.

As shown in FIG. 13, each of these cooling paths 15 is formed into a zigzag in the axial direction, and each neighboring two of the cooling paths 15 communicate with each other. In other words, a plurality of cooling paths 15 are formed by placing a plurality of first paths 15a and a plurality of second paths 15b in an alternating series in the axial direction. The plurality of first paths 15a are formed in pitches P1 in a direction orthogonal to the axial direction. The plurality of second paths 15b are formed in pitches P2 also in a direction orthogonal to the axial direction.

Such a configuration makes it possible to directly cool each permanent magnet 8. In particular, since the cooling paths 15 are formed into zigzags in the axial direction, the formation makes it possible to increase the heat transfer area to a large extent in comparison with the case where the cooling paths 15 are formed in straight lines. This enhances the performance of cooling the permanent magnet 8.

As a result, this makes it possible to abate the reduction of the amount of magnetic flux which stems from the rise of the temperature of each of the permanent magnets 8, and to thus enhance the performances of the rotating electrical machine, including the torque characteristics and the efficiencies. Furthermore, this eliminates the likelihood that the performances may be deteriorated due to the heat demagnetization (irreversible demagnetization), and thus enhances the reliability.

Moreover, the provision of the cooling paths 15 in the inner surface of each of the cavities 12 near the outer periphery is effective for decreasing the rotational centrifugal force due to the reduction of the mass. Accordingly, this makes it possible to reduce the stress generated in the rotor core 7.

It should be noted that an arbitrary combination of the configurations respectively according to the first to the sixth embodiments makes it possible to further enhance the cooling performance, and to further reduce the stress generated in the rotor core 7, in addition to bringing about the effects respectively of the embodiments. Accordingly, this makes it possible to enhance the reliability.

Other various variations and modifications can be introduced to each of the embodiments, which have been described above, without departing from the scope of the present invention.

What is claimed is:

1. A rotating electrical machine comprising:
    a ring-shaped stator; and
    a rotor arranged inside the stator,
    wherein the stator includes a stator core with armature windings,
    wherein the rotor includes a rotor core in which permanent magnets are inserted and cooling holes are formed, and a coolant flowing in each of the cooling holes,
    wherein a pair of two cavities are provided to each of a plurality of predetermined locations set up along an outer periphery at intervals in a circumferential direction of the rotor core and each permanent magnet is inserted in each cavity, and each pair of two cavities are formed in a V-formation which opens to a rotation axis of the rotor core to make a magnetic pole there-between, and
    wherein each of the cooling holes is formed at a middle position of the magnetic pole made between each pair of two cavities so as to have a sectional view, an outside half of which is convex toward an outer periphery and an inside half of which is arcuate and curved inward to the rotation axis of the rotor core.

2. The rotating electrical machine according to claim 1, wherein a thickness of a part between the cooling hole and an inner periphery of the rotor (Ti) is designed as $Ti \times 60/(\pi \times D \times N) \geq 1.5 \times 10^{-4}$, where D denotes an outer diameter of the rotor, N denotes a maximum number of rotation.

3. The rotating electrical machine according to claim 1, wherein a shortest distance between one of the paired permanent magnets and corresponding one of the cooling holes (Wm) is designed as $Wm/Wp \geq 0.60$, where Wp denotes a distance between paired permanent magnets at a magnetic pole formed along the outer periphery of the rotor core.

* * * * *